Patented May 16, 1933

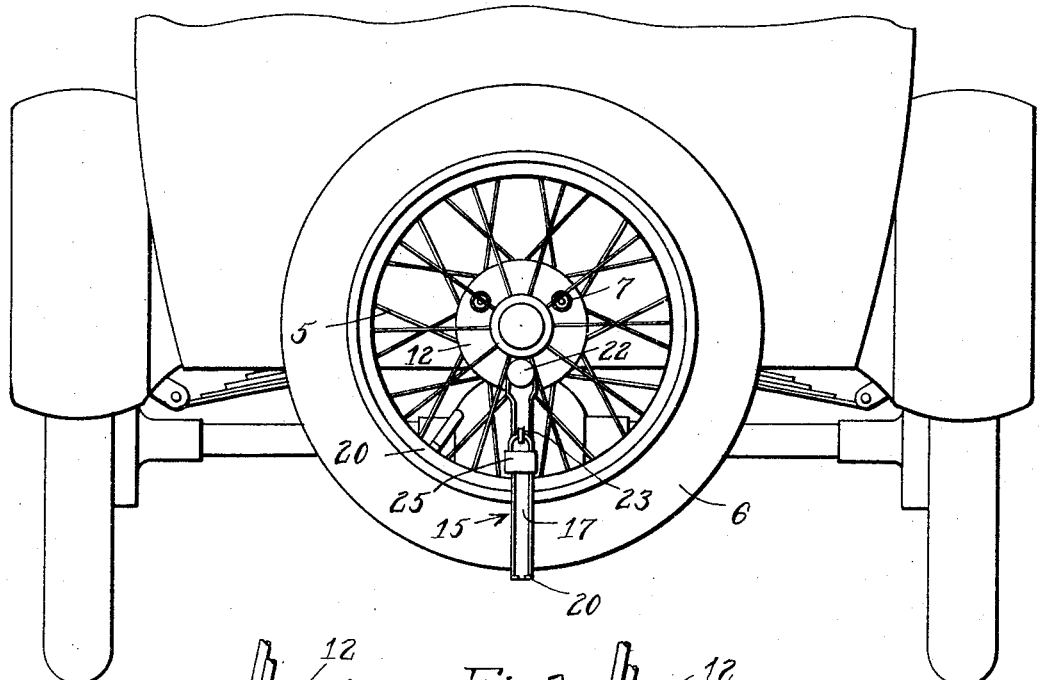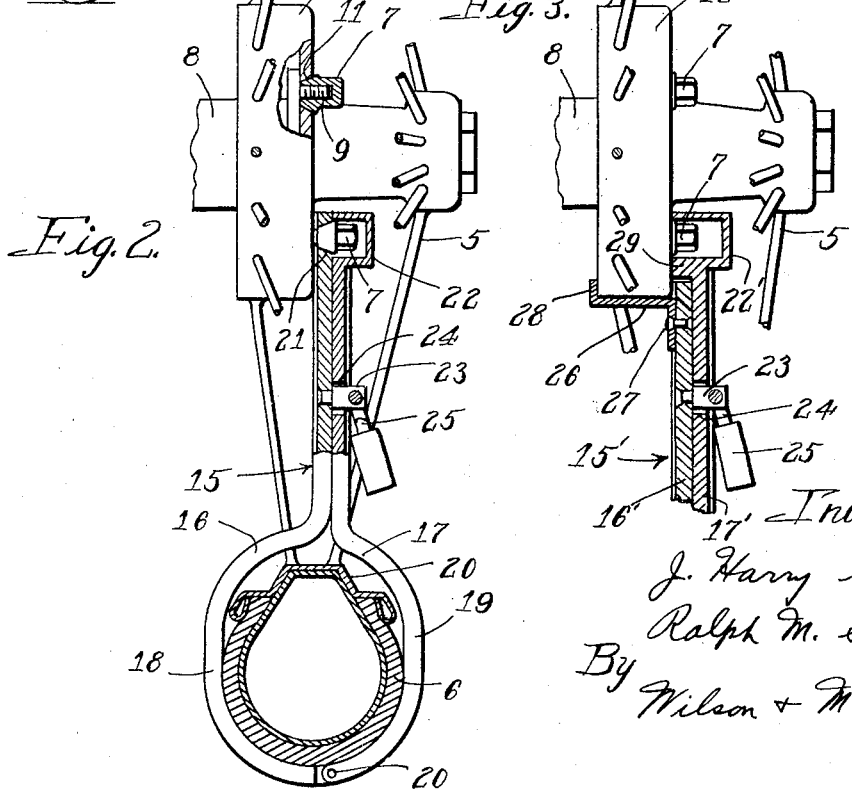

1,909,723

UNITED STATES PATENT OFFICE

J. HARRY SARIS AND RALPH M. SARIS, OF BELOIT, WISCONSIN

LOCK FOR SPARE WHEELS AND TIRES

Application filed May 5, 1927, Serial No. 188,914. Renewed July 26, 1932.

This invention relates to a novel lock for the spare wheel and tire of an automobile, and is especially designed and adapted for use on Ford cars equipped with demountable wheels.

Spare wheels of the type referred to are arranged to be fastened on the carrier brackets simply by means of a number of nuts threading on the studs provided on the brackets. When these are left unprotected there is a considerable danger of loss by theft as it is a simple matter for a thief to remove the few nuts and dismount the spare wheel, thus making off with wheel and tire complete at a considerable loss to the automobile owner. If some precaution is taken to prevent removal of the wheel itself, there is equal danger of having the tire stolen since it is a comparatively easy matter for the thief to deflate the tire and remove the same from the rim. It thus becomes necessary for complete protection to guard against the theft of both the wheel and tire. The lock of the present invention gives this double measure of protection by providing a part passing around the rim to take care of the tire, and another part which fastens onto the wheel in such a manner that one of the nuts holding the wheel is neatly concealed and access thereto is prevented, so that even though the other nuts holding the wheel may be removed, the thief will not succeed in unfastening the wheel completely.

The invention is illustrated in the accompanying drawing, wherein Fig. 1 is a rear view of a Ford car showing the spare wheel and tire protected by means of the lock of our invention;

Fig. 2 is an enlarged sectional detail to better illustrate the manner of application of the lock and show the simple construction thereof; and Fig. 3 is a similar view, partly broken away, of another lock of practically the same construction. While Fig. 1 represents a rear view of the lock of Fig. 2, it may here be stated that the lock of Fig. 3 presents the same appearance.

The reference numeral 5 designates a demountable type of wire wheel complete with tire 6 fastened as by means of nuts 7 on a carrier bracket 8 projecting from the back of the body or frame of the car. The nuts 7, of which there are three for fastening the wheel in place, thread on the carrier studs 9 which pass through openings 11 provided therefor in the hub 12 of the wheel. This construction is now standard and well known. The nuts 7 have tapered ends so as to be self-centering in the taper of the openings 11, it being understood that the same type of nuts are used in the mounting of the wheels on the axles of the car in which case the self-centering feature becomes important. Where no precaution is taken to prevent the unauthorized removal of the nuts 7 it will be obvious that a thief would have no difficulty in removing the wheel and thus make off with both the tire and wheel. On the other hand, if some means is provided to lock the wheel, there is danger of loss of the tire as there is no difficulty in deflating the tire and removing the same from the rim. It will presently appear that the lock of our invention provides protection for both the wheel and the tire.

The lock 15 shown in Fig. 2 is in the form of a shackle consisting of an inside piece 16 and an outside piece 17. The two pieces are conformed with curved offset ends 18 and 19 respectively hinged together by means of a countersunk rivet at 20, the countersinking being important in that it makes it practically an impossibility for one to remove the rivet by use of a punch or in any other ordinary manner. The offset portions 18 and 19 provide a loop therebetween to receive the tire 6 and the rim 20 of the wheel. Throughout the rest of their length, that is, between the rim and the hub of the wheel, the pieces 16 and 17 lie in close contact, and when the shackle is locked there is little likelihood of a thief succeeding in entering a prying tool therebetween to force the lock. The piece 16 at the hub end thereof has an opening 21 therethrough corresponding in size and form to one of the openings 11 provided in the hub 12 of the wheel. This opening receives any one of the studs 9, preferably the lowermost one, and the nut 7 threading thereon is arranged to fasten the piece 16 with the wheel hub 12 to the bracket 8. The other piece 17 of the shackle has a cap portion 22 on the adjacent end thereof to provide a recess for the reception of the nut whereby neatly to conceal the same and prevent access thereto when the shackle is locked. An eye 23 is provided on the piece 16 approximately half-way between the hub end and the rim end of the shackle, and is arranged to project through an opening 24 provided in the piece 17 so that a padlock 25 may be applied thereto to lock the shackle. It will be obvious that anyone removing those nuts which are left uncovered would not succeed in removing the wheel without gaining access to the nut concealed and protected by the shackle. In that way a thief is completely frustrated in an attempt to steal the wheel and tire, or the tire alone, inasmuch as the tire is locked with the wheel. The location of the lock 25 at the mid-point instead of at one end of the shackle gives greater certainty of the pieces 16 and 17 being kept lying in close contact all of the way between the rim and the hub of the wheel, so that a crowbar or some other prying tool cannot be entered therebetween either to break the lock or spread the pieces sufficiently to enable unthreading of the nut which is otherwise concealed. The mid location of the lock 25 also prevents the thief from securing much leverage on the lock by the use of a prying tool entered between the pieces 16 and 17 at either the hub end or the rim end of the shackle. The pieces are furthermore of such heavy cross section that a thief would have little success in cutting or sawing through the same, it being further understood that the shackle may be properly hardened to guard against that possibility.

The lock 15' of Fig. 3, as stated above, is of practically the same construction as the lock 15, the only difference being in the form of the end which makes connection with the wheel hub. It will be seen that the inside piece 16' is not fastened by the nut 7, as in the other case, but terminates short of it in front of the hub 12. An arm 26 is riveted, as at 27, onto the back of the piece 16' and extends rearwardly therefrom to permit its bent up end 28 to engage behind the rim of the hub in the manner shown. The outside piece 17' has a cap portion 22' formed on the end thereof to fit over the nut 7 as in the other lock but in this case the piece 17' extends beyond the end of the piece 16' and is formed to overlap the end of the piece 16', as indicated at 29, so as not to leave any space between the wheel hub and the cap portion where a tool might be introduced to pry the lock off. The padlock 25 serves as in the other form to keep the shackle closed so that it is impossible to get at the concealed nut to dismount the wheel and is also impossible to remove the tire from the wheel. The slight modification in construction renders this type easier to put on or take off than the other type. However, the principal reason for providing this type is that it can be used on cars equipped with a full rear bumper fitting close up to the spare wheel, in which cases the other type of lock is unsuited.

It is believed the foregoing description conveys a full understanding of our invention and of its various objects and advantages. It will be recognized that the invention is capable of some slight modification in certain details thereof without seriously departing from the general spirit and purpose of the invention. For that reason the appended claims have been drawn with a view to covering such variations as properly come within the scope of the invention.

We claim:

1. The combination with a carrier bracket having studs thereon, and a wheel provided with a tire and arranged to be fastened demountably on said studs, said wheel having openings in the hub thereof for receiving said studs, and nuts threaded on the studs for securing the wheel in place, of a locking device for preventing unauthorized removal of said wheel from the carrier, comprising a two-piece shackle providing a portion for embracing the rim of the wheel to prevent removal of a tire therefrom, the one piece of the shackle being arranged to fasten onto the wheel hub, and the other piece of said shackle having a recess therein for receiving and concealing one of said nuts, and means for locking the pieces together securely clasping the rim of the wheel and also preventing access to the nut fastening the wheel hub to the carrier.

2. A structure as set forth in claim 1, wherein the two pieces of the shackle are hingedly connected so as to permit one shackle piece to fold onto the other to embrace the rim of the wheel, and the two pieces to extend alongside one another in close contact between the rim and the hub of the wheel, the locking means being approximately midway between the hub end of the shackle and the rim end thereof.

3. A lock of the character described, comprising a two-piece shackle, the two pieces being conformed to lie in close contact with one another for a portion of their length approximately equivalent to the space between the hub of a wheel on which the lock is used and the rim thereof, said pieces being conformed the rest of their length to provide a loop therebetween to embrace the rim of the wheel, a hinged connection between said pieces at the latter end thereof to permit the removal or placement thereof on the wheel, the one piece having the other end thereof formed to fasten onto the wheel hub, and the other piece having a recess therein in the adjacent end thereof for enclosing a nut also at the wheel hub, and means for locking the shackle.

4. A lock for a spare wheel and tire comprising a shackle made up of an inside and an outside member, both of a length to reach from the tread of the tire to the hub of the wheel, the latter being adapted to be fastened in the usual way by bolts on a carrier passing through the hub, the outer portion of the inside member being formed to fit closely around the tire and wheel rim and the inner portion thereof being formed to fasten detachably onto the wheel hub, the outer portion of the outside member being connected with the inside member and being arranged for closely encircling the rest of the tire and wheel rim, the two members lying in close contact between the wheel rim and the wheel hub, the inner portion of the outside member being formed to receive and prevent the turning of the nut on one of the aforesaid carrier bolts, and means for locking the members in closed position.

5. A lock for a spare wheel and tire comprising a shackle made up of an inside and an outside member, both of a length to reach from the tread of the tire to the hub of the wheel, the latter being adapted to be fastened in the usual way by bolts on a carrier passing through the hub, the outer portion of the inside member being formed to fit closely around the tire and wheel rim and the inner portion thereof having a fork formed thereon arranged to receive the peripheral portion of the wheel hub therein at one of the carrier bolts, the outer portion of the outside member being hingedly connected with the corresponding portion of the inside member and being arranged for closely encircling the rest of the tire and wheel rim, said outside member lying in close contact with the inside member between the wheel rim and wheel hub, the inner portion of the outside member extending beyond the corresponding portion of the inside member and being enlarged to provide a hollow boss to overlie the nut on the aforesaid carrier bolt and lie flush with the face of the wheel hub whereby to prevent access to the nut, and means between the hub and rim portions of said shackle for locking the inside and outside members together.

6. The combination with a carrier bracket having studs thereon, and a wheel provided with a tire and arranged to be fastened demountably on said studs, said wheel having openings in the hub thereof for receiving said studs, and being arranged to have nuts threaded on the studs to secure the wheel in place, of a locking device for preventing unauthorized removal of said wheel from the carrier, comprising a shackle formed of two pieces flexibly connected together providing a portion for embracing the rim of the wheel to prevent removal of the tire therefrom, the one piece of the shackle being disposed on the inner side of the wheel and the other piece extending on the outside of the wheel, the inner piece being arranged to be suitably fixed with respect to the carrier and wheel, and the outer piece having a recess provided therein adapted to receive and conceal a nut threading on one of the studs and serving to secure the wheel in place on the carrier, and means for locking the outer piece in position covering said nut, the two pieces being thereby also held in position securely clasping the rim of the wheel to prevent removal of the tire therefrom.

7. In a device for use with a carrier for a spare wheel part including a tire, fastening means making the wheel part fast to the carrier, the combination of a strap adapted to extend from the fastening means outwardly around the tire and back to the fastening means with one end portion of the strap made fast by the fastening means and the other end cooperating with the fastening means to prevent its release, and means for locking the last-mentioned end portion of the strap in such cooperation with the fastening means.

8. In a device for use with a carrier for a spare wheel part including a tire, fastening means making the wheel part fast to the carrier, the combination of a strap adapted to extend from the fastening means outwardly around the tire and back to the fastening means with one end portion of the strap made fast by the fastening means and the other end in position to prevent the release of the fastening means, and means for locking the end portions of the strap together.

9. In a device for use with a carrier for a spare wheel part including a tire, fastening means making the wheel part fast to the carrier and including a nut, the combination of a strap adapted to extend outwardly from the fastening means around the tire and back to the fastening means, with one end portion of the strap made fast by the fastening means and the other end portion of the strap preventing the removal of the nut, and means for locking the last-mentioned end portion of the strap in place.

10. In a device for use with a carrier for a spare wheel part including a tire, fastening means making the wheel part fast to the carrier, the combination of a strap adapted to extend from the carrier outwardly around the tire and back to the fastening means with one portion of the strap in position to prevent the release of the fastening means, a stud on one end portion of the strap projecting through the other end portion, and a lock on the projecting portion of the stud.

11. In a device for use with a carrier for a spare wheel part including a tire, fastening means making the wheel part fast to the carrier, the combination of a strap adapted to extend from the fastening means outwardly around the tire and back to the fastening means with one end portion of the strap made fast by the fastening means to prevent its release, and means for locking the end portions of the strap together comprising an element passing through the end portions of the strap adjacent to the fastening means and lock mechanism cooperating therewith.

12. In a device for use with a carrier for a spare wheel part including a tire, fastening means making the wheel part fast to the carrier, the combination of a strap adapted to extend from the carrier outwardly around the tire and back to the fastening means with one portion of the strap in position to prevent the release of the fastening means, and means for locking that portion of the strap in such position.

13. The combination with a wheel carrier bracket having threaded studs projecting therefrom, a wheel equipped with a tire and having a hub provided with openings through which the studs project when the wheel is positioned on the carrier, and nuts adapted to be screwed onto the projecting ends of the studs to secure the wheel hub in position on the carrier, of a locking device for preventing unauthorized removal of the wheel and its tire, or either, from the carrier, having a shackle structure shaped to embrace the rim of the wheel and the tire to prevent removal of the tire therefrom, the shackle structure having end portions extending from the rim and tire embracing portion inwardly toward the wheel hub and arranged to be brought into open relation to permit placing the shackle structure over the tire in the rim and tire embracing position and into a closed relation in which the outermost member is in a locking position, said outermost member being provided with means adapted to receive and conceal a nut screwed onto one of the projecting studs when such nut is screwed down to hold the wheel hub in position on the carrier, and locking means cooperating with said concealing means to prevent removal thereof from its said concealing position.

14. The combination with a wheel carrier bracket having threaded studs projecting therefrom, a wheel equipped with a tire and having a hub provided with openings through which the studs project when the wheel is positioned on the carrier, and nuts adapted to be screwed onto the projecting ends of the studs to secure the wheel hub in position on the carrier, of a locking device for preventing unauthorized removal of the wheel and its tire, or either, from the carrier, having a shackle structure shaped to embrace the rim of the wheel and the tire to prevent removal of the tire therefrom, said structure having two end portions extending from the rim and tire embracing portion toward the wheel hub, one end portion having an opening to receive one of the projecting studs before its nut is applied and being held in position when said nut is tightened to hold the wheel hub in position on the carrier, and the other end portion being equipped with means to receive and conceal said nut after it has been applied and tightened, and means cooperating with said concealing means to prevent removal thereof from its nut concealing position.

15. The combination with a wheel carrier bracket having threaded studs projecting therefrom, a wheel equipped with a tire and having a hub provided with openings through which the studs project when the wheel is positioned on the carrier, and nuts adapted to be screwed onto the projecting ends of the studs to secure the wheel hub in position on the carrier, of a shackle structure shaped to embrace the rim and the wheel of the tire to prevent removal of the tire therefrom, said shackle structure having a member adapted to fit over one of said studs before its nut is applied and having another member equipped with means adapted to fit over and conceal a nut after it has been screwed onto said stud for holding the wheel in position on the carrier, said means serving to prevent removal of said nut, and locking means cooperating with said concealing means to prevent removal thereof from its nut concealing position.

16. The combination with a wheel carrier bracket having threaded studs projecting therefrom, a wheel equipped with a tire and having a hub provided with openings through which the studs project when the wheel is positioned on the carrier, and nuts adapted to be screwed onto the projecting ends of the studs to secure the wheel hub in position on the carrier, of a structure shaped to embrace the rim of the wheel and the tire to prevent removal of the tire therefrom, said structure having one member at the inner side of the wheel and another member at the outer side thereof extending from the rim and tire embracing portion toward the hub, the inner member being held in fixed relation with respect to said carrier, the outer member being provided with means adapted to embrace and conceal a nut screwed onto one of said studs which has been tightened on the stud to hold the wheel in position on the carrier, and locking means cooperating with said concealing means to prevent removal thereof from its nut concealing position.

17. The combination with a wheel carrier bracket having threaded studs projecting therefrom, a wheel equipped with a tire and having a hub provided with openings through which the studs project when the wheel is positioned on the carrier, and nuts adapted to be screwed onto the projecting ends of the studs to secure the wheel hub in position on the carrier, of a locking device for preventing unauthorized removal of the wheel and its tire, or either, from the carrier, having a shackle structure shaped to embrace the rim of the wheel and the tire to prevent removal of the tire therefrom, and having two end portions extending from the rim and tire embracing portion and arranged to be brought into open relation to permit placing the locking device over the tire and into closed relation constituting the locking position, one end portion being positioned over one of the projecting studs before the nut is applied thereto and the other end portion being equipped with means to receive and conceal said nut after it is applied to said stud and tightened to hold the wheel in position, and locking means for holding the said end portions of the shackle structure in said closed relation.

18. The combination with a carrier bracket having studs thereon, and a wheel provided with a tire and arranged to be fastened demountably on said studs, said wheel having openings in the hub thereof for receiving said studs, and being arranged to have nuts threaded on the studs to secure the wheel in place, of a locking device for preventing unauthorized removal of said wheel from the carrier, comprising a shackle formed of two pieces flexibly connected together providing a portion for embracing the rim of the wheel to prevent removal of the tire therefrom, the one piece of the shackle being disposed on the inner side of the wheel and the other piece extending on the outside of the wheel, the inner piece being formed at its free end for reception of the rim portion of the hub of the wheel for locking purposes, and the outer piece having a recess provided therein adapted to receive a nut threaded on one of the studs and serving to secure the wheel in place on the carrier, and means for locking the outer piece in position to prevent the turning of said nut, the two pieces being thereby also held in position securely clasping the rim of the wheel to prevent removal of the tire therefrom.

19. A lock for a spare wheel and tire comprising a shackle made up of an inside and an outside member, both of a length to reach from the tread of the tire to the hub of the wheel, the latter being adapted to be fastened in the usual way by bolts on a carrier passing through the hub, the outer portion of the inside member being formed to fit closely around the tire and wheel rim and the inner portion thereof having a fork formed thereon arranged to receive the peripheral portion of the wheel hub therein at one of the carrier bolts, the outer portion of the outside member being hingedly connected with the corresponding portion of the inside member and being arranged for closely encircling the rest of the tire and wheel rim, said outside member lying in close contact with the inside member between the wheel rim and wheel hub, the inner portion of the outside member extending beyond the corresponding portion of the inside member and being enlarged to provide a hollow boss to overlie the nut on the aforesaid carrier bolt and lie flush with the face of the wheel hub whereby to prevent access to the nut, and means between the hub and rim portions of said shackle for locking the inside and outside members together.

20. The combination with a carrier bracket having studs thereon, and a wheel suitably provided with a tire and arranged to be fastened by its hub demountably on said studs, said wheel having openings in the hub thereof for receiving said studs, and nuts threaded on the studs for securing the wheel in place, of a locking device for preventing unauthorized removal of said wheel from the carrier, comprising a two-piece shackle providing a portion for embracing the rim of the wheel to prevent removal of a tire therefrom the one piece of the shackle being arranged to fasten onto the rim portion of the wheel hub, and the other piece of said shackle being formed for cooperation with one of said nuts to prevent turning thereof, and means for locking the pieces together securely clasping the rim of the wheel and also preventing turning of the nut fastening the wheel hub to the carrier.

21. A lock of the character described, comprising a two-piece shackle, the two pieces being conformed to lie in close contact with one another for a portion of their length approximately equivalent to the space between the hub of a wheel on which the lock is used and the rim thereof, said pieces being conformed the rest of their length to provide a loop therebetween to embrace the rim of the wheel, a hinged connection between said pieces at the latter end thereof to permit the removal or placement thereof on the wheel, the one piece having the other end thereof formed to hook onto the rim portion of the wheel hub, and the other piece having its corresponding end reaching beyond the end of the first mentioned piece and formed for reception of a nut on the side of the wheel hub for the purposes mentioned, and means for locking the shackle.

In witness whereof we hereunto affix our signatures.

J. HARRY SARIS.
RALPH M. SARIS.